Figure 1:
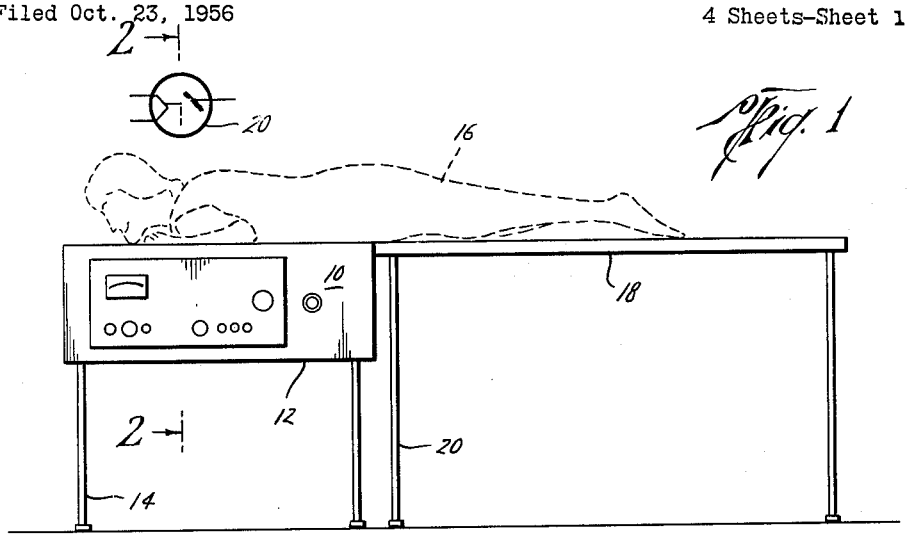

Oct. 9, 1962 W. D. WEST 3,057,998
SCANNING DEVICE AND METHOD
Filed Oct. 23, 1956 4 Sheets-Sheet 1

Walton D. West
INVENTOR.

Oct. 9, 1962 W. D. WEST 3,057,998
SCANNING DEVICE AND METHOD
Filed Oct. 23, 1956 4 Sheets-Sheet 2

Walton D. West
INVENTOR.

BY James F. Weiler &
Jefferson D. Giller
ATTORNEYS

Oct. 9, 1962 W. D. WEST 3,057,998
SCANNING DEVICE AND METHOD
Filed Oct. 23, 1956 4 Sheets-Sheet 3

Walton D. West
INVENTOR.

BY James F. Weiler &
Jefferson D. Giller
ATTORNEYS

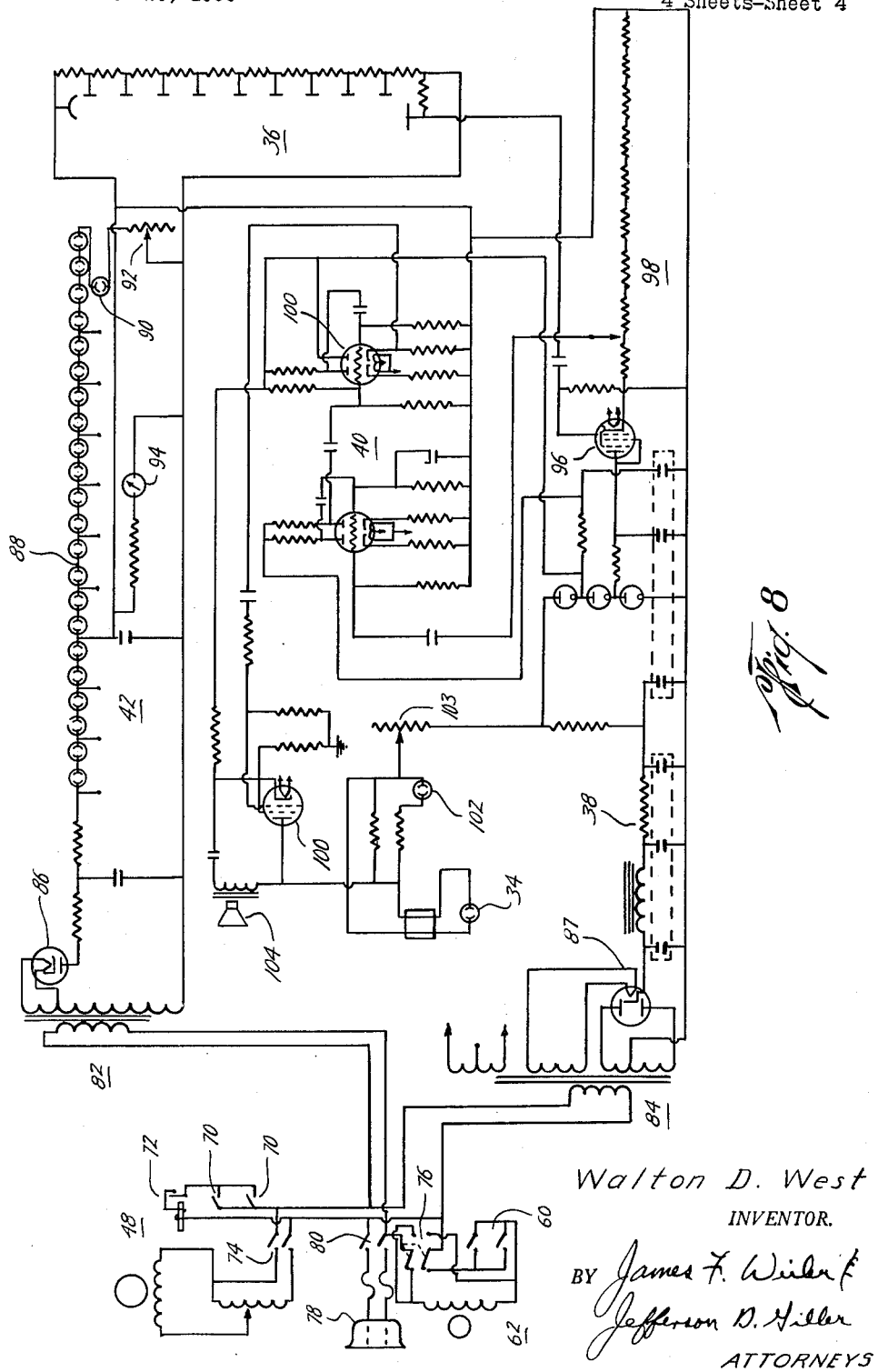

United States Patent Office 3,057,998
Patented Oct. 9, 1962

3,057,998
SCANNING DEVICE AND METHOD
Walton D. West, Houston, Tex., assignor to Baylor University, Houston, Tex., a non-profit corporation of Texas
Filed Oct. 23, 1956, Ser. No. 617,785
12 Claims. (Cl. 250—65)

The present invention relates to a scanning device and method of and, more particularly, to a device for and a method of scintillation scanning useful in medical diagnosis.

There are several devices to convert the impulses from a scintillation counter into a visual representation of a radiating area. In one such device, the radiating area is reproduced by building up a pattern of dots on ordinary photographic enlarging paper. The dots are produced by the light that accompanies the firing of a strobotron discharge tube. Light from the discharge tube then illuminates a diaphragm, an image of which is formed on the photographic paper by a microscope objective. Scanners of this and other types have utility in medical diagnosis inasmuch as they detect and record certain concentrations of a radioactive substance previously introduced into a patient's system. Scanners of this type are particularly useful in detecting the presence of cancer.

Scanners of this type have certain disadvantages, however, in that electromechanical means, such as a relay, are used which does not operate fast enough to record all the counts. Only one count for each eight or ten actual counts is recorded and an average thereof used. This, of course, does not give as accurate results as a scanner which includes means to flash a count lamp at a sufficiently rapid rate of speed so that all counts or dots are placed on the film. The results obtained by such a scanner would be improved both qualitatively and quantitatively. Additionally, conventional scanners are disadvantageous in that the recording of the pattern of dots is not in relation to the particular organ or organs or portions of the patient being scanned.

Accordingly, it would be highly advantageous, and it is an object of this invention, to provide a scanning device in which the radiating area is reproduced by building up a pattern of dots on ordinary photographic paper and in which means are provided so that the exposure count lamps flash at a sufficiently rapid rate of speed so that all counts or dots are placed on the film.

Yet a further object of the present invention is the provision of such a scanning device which utilizes a discharge tube or a modulation tube to flash the exposure count lamps so that these lamps are flashed at a sufficiently rapid rate of speed to place all counts or dots on the film.

It would also be highly advantageous, and it is an object of the presnt invention, to provide a scanning device in combination with an X-ray device so that an X-ray of the portion of the patient being scanned is developed on the same film with the scanned portion to bring the latter into proper relationship with the patient.

Yet a further object of this invention is the provision of an improved method of scintillation scanning of the body of a patient into which a radioactive substance has been introduced which includes scanning the radiating area with a collimated scintillation counter, converting the impulses from the scintillation counter into a visual record, and providing an X-ray of the radiating area being scanned on the same visual record thereby depicting the localized radioactivity with reference to the patient's body structure.

It is still a further object of the present invention to provide a scanning device of the character mentioned which includes an improved structure for reciprocating a radiation detecting head both longitudinally and transversely while building up the pattern of dots on the film.

Yet a further object of the present invention is the provision of an improved scanner head for scintillation scanning used for medical diagnosis.

Figure 2:
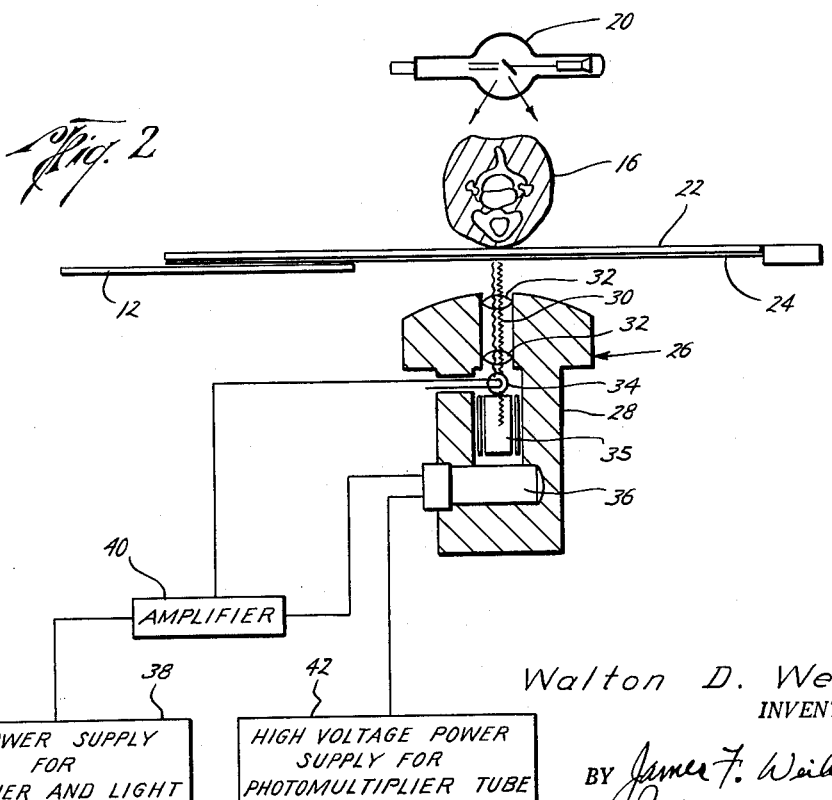
Figure 3:
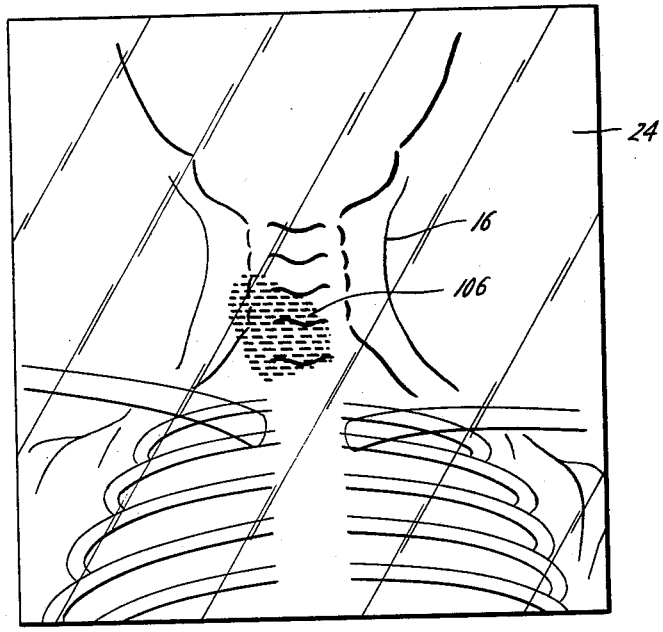

Other and further objects, features and advantages will be apparent from the following description of a presently preferred embodiment of the invention, given for the purpose of disclosure, and taken in conjunction with the accompanying drawings, where like character references designate like parts throughout the several views, and where FIGURE 1 is a side elevation illustrating a scanning device according to the invention, FIGURE 2 is an enlarged cross-sectional view taken along the line 2—2 of FIGURE 1 and schematically illustrates a circuit for the radiation detecting head, FIGURE 3 is a typical example of a photographic recording of the radiating area reproduced by building up a pattern of dots with relation to an X-ray of the portion scanned of the patient.

Figure 6:
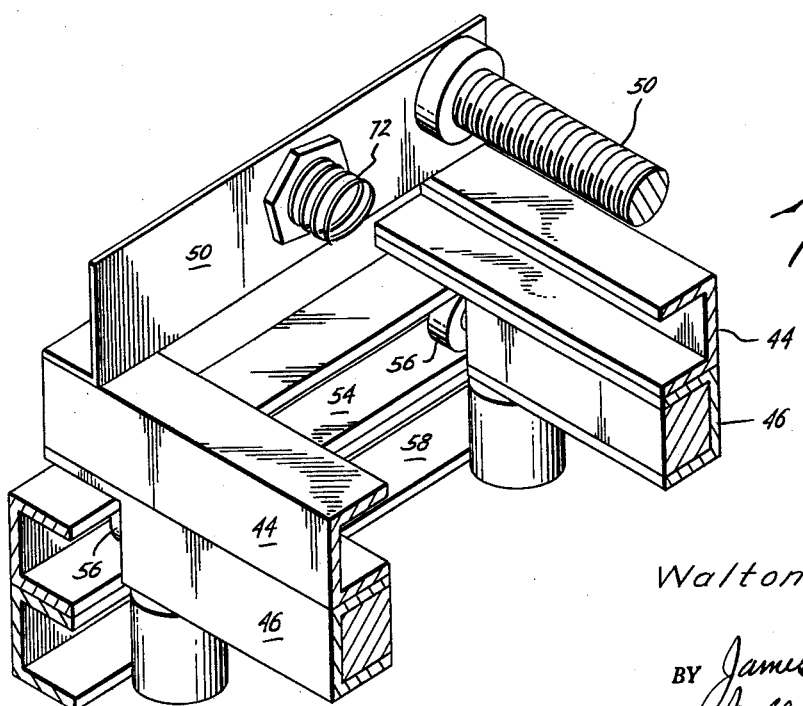
Figure 4:
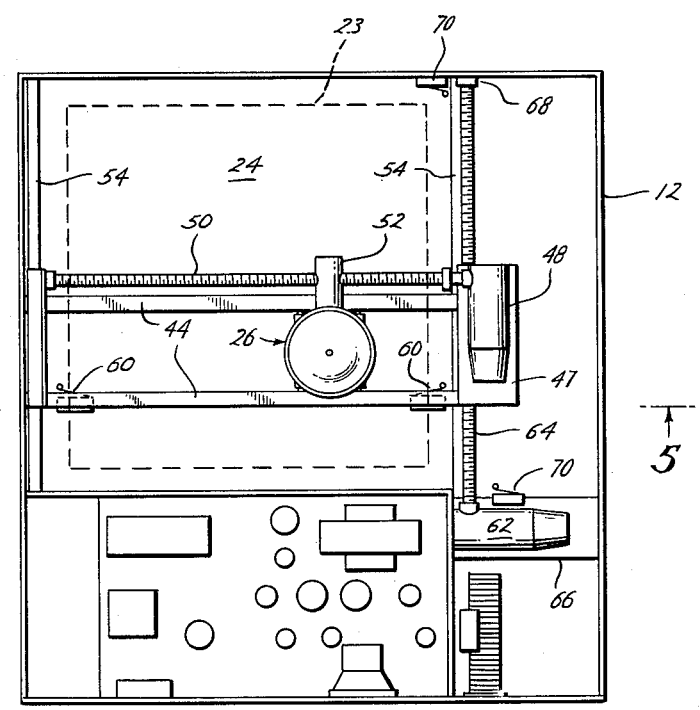
Figure 5:
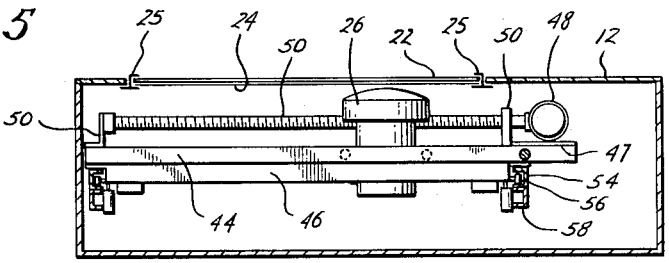
Figure 7:
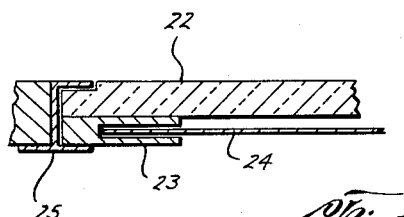

FIGURE 4 is a view from the bottom illustrating the mechanism for reciprocating the radiation detecting head both transversely and longitudinally, FIGURE 5 is a cross-sectional view taken along the line 5—5 of FIGURE 4, FIGURE 6 is a fragmentary, perspective, enlarged view illustrating the guides and stop member at one end of reciprocation, FIGURE 7 is a fragmentary, cross-sectional view illustrating the table and film holder, and FIGURE 8 is a circuit diagram illustrating a presently preferred circuit for the scanning device.

Referring to the drawings, and particularly to FIGURE 1, the scanning device of the present invention is generally indicated by the reference numeral 10 and a portion thereof may be supported or housed in the support or cabinet 12 which is supported by the legs 14. In order to accommodate the patient 16, an auxiliary table or supporting device 18 may be provided which is supported by the legs 20 so that the top of the cabinet 12 and the table 18 present an even surface for supporting the patient. It is noted that the patient 16 is positioned on the top of the scanning device 10 and between the scanning device and the X-ray tube diagrammatically illustrated at 20. No detailed description of the X-ray tube and associated parts of the X-ray apparatus is given as any conventional X-ray apparatus may be used and, the X-ray machine, as such, does not constitute the present invention.

Thus, as best seen in FIGURE 2, the patient 16 is disposed on the top surface 22 of the cabinet 12 and under the X-ray tube 20. As best seen in FIGURE 7, the top surface 22 may be a sheet of glass or other ray penetrating material and the film 24 is held under the surface 22 by the slotted film holder 23 held in place by the brackets 25. Thus, the film and surface 22 if desired, may be removed and reinserted in place in the cabinet 12.

A radiation detecting head, generally indicated by the reference numeral 26, is disposed under the upper surface 22 and is mounted for transverse and longitudinal movement, as described later. Thus, as the radiation-detecting head is reciprocated transversely a record of a radioactive image from a patient is recorded and an X-ray of the portion of the patient 16 being scanned is provided on the film 24, as best seen in FIGURE 3.

Turning again to FIGURE 2, the radiation detecting head 26 includes a shield 28, such as a lead shield, for collimation, and is provided with the bore or opening 30 into which is placed the lens 32, a recorder lamp 34, a crystal 35, for example, a thallium activated crystal having a shield such as aluminum to prevent light from the recorder lamp 34 from feeding back, and a photomultiplier tube 36, which is of the side window type although any desired type may be used.

The power supply 38 is provided for the amplifier 40 and recorder or exposure count lamp 34, and a high voltage power supply 42 is provided for the photomultiplier tube 36.

Thus, as will be more apparent later, radioactive substance is introduced in the patient's body which enters the scanning head 26 and enters the scintillation crystal 35 and produces light which actuates the photomultiplier tube 36. This tube 36 multiplies each scintillation of radioactivity to a strength through means presently described so that the amplifier 40 receives sufficient signal strength. Each scintillation is therefore amplified in amplifier 40 and subsequently flashes the recorder or exposure count lamp 34 through the lens system 32 to record a dot on the film 24. Simultaneously with, or before or after, this recordation, an X-ray of the portion of the patient being scanned is made on the same film 24.

Turning now to FIGURE 4, a particularly satisfactory and improved arrangement is illustrated for reciprocating the radiation-detecting head 26 longitudinally and transversely across the film 22. To this end, the radiation head 26 is slidably mounted on the pair of transversely extending ways or guides 44 for transverse reciprocation across the film 24. The ways 44 are in effect part of a carriage 46, see FIGURE 5, which includes the support 47 upon which the electric scanning motor 48 is mounted. A double worm screw 50 is also secured to the carriage 46 by means of the uprights 50 and is secured to and driven by the motor 48 and passes through an internally threaded element 52 secured to the radiation detecting head 26.

As best seen in FIGURE 5, the carriage 46 is slidably mounted in the longitudinally extending ways or guides 54 by means of the wheels 56, the ways 54 being supported by the frame members 58 secured to the cabinet 12.

A pair of limit switches 60 are secured to each end of the carriage 46 so that as the engageable elements of the detecting head 26 contacts them at each end of the stroke, the electric indexing motor 62 drives the double worm screw 64 a very short time.

The indexing motor 62 is mounted on the motor support 66 secured to frame members of the cabinet 12 and the double worm screw is connected thereto and to the boss 68 at the other end for rotation. The carriage 46 has an internally threaded element receiving the double worm screw 64 so that upon rotation thereof the carriage 46 will be moved. The limit switches 70 are provided at each end of the stroke of the carriage 46 for sounding an end of the film buzzer presently to be described.

The construction of the carriage 46, transverse ways 44 and longitudinal ways 54 are illustrated in FIGURE 6 and a bumper spring 72 is provided at each end of the carriage 46, such as on the flanges 50, to provide a cushion stop for the radiation-detecting head 26 before return movement.

The arrangement just described for transverse and longitudinal reciprocating of the radiation detecting head thus provides transverse movement of the scanning head 26 by means of the constantly driven scanning motor 48. As the scanning head 26 is reciprocated transversely it alternately comes into contact with the limit switches 60 which energize and de-energize the electric indexing motor 62 thereby momentarily rotating the double worm screw 64 so that a very small increment of longitudinal travel of the carriage is obtained at each end of its stroke so that the entire area of the film to be exposed is traversed.

When the carriage 46 is at either end of its longitudinal stroke, the limit switches 70 are engaged to sound the buzzer to indicate the end of the film.

Turning now to FIGURE 8, a circuit diagram is presented which illustrates a satisfactory circuit for transverse and longitudinal reciprocation of the scanning head and for recording the concentration of a previously introduced radioactive substance in the patient's body. Referring now to this circuit diagram, the previously mentioned buzzer 72 is illustrated which is energized by closing one or the other limit or microswitches 70 disposed at each end of the film. This buzzer indicates that the end of the film has been reached. The double pole switch 74 is provided for closing the circuit to the scanner motor and the double pole, double throw momentary contact switch 76 is provided for the index motor 62. As mentioned previously, the contact with the limit or microswitches 60 of the scanner head causes the circuit to be closed to the double pole, double throw momentary contact switch 76 so that the motor 62 is driven a predetermined increment for indexing or moving the carriage longitudinally a very short distance.

Power is supplied to the system, such as from the plug-in 78 through the double pole switch 80 to the transformers 82 and 84, the former being for the high voltage power supply for the photomultiplier tube 36, the latter being for the power supply for the amplifier 40 and exposure count light 34.

The high voltage power supply for the photomultiplier tube 36 includes the rectifier 86 and a plurality or group of neon tubes or lamps 88 which effectively serve as voltage regulators and advantageously enables the making of desirable power adjustments without many resistors. The pilot lamp 90 is provided for indicating that power is being supplied to the photomultiplier tube 36, which power is supplied through the potentiometer or variable resistance 92. A volt meter 94 is provided to indicate the voltage supplied to the photomultiplier tube 36 for making power adjustments with the neon tubes or lamps 88. While the use of neon tubes is highly advantageous, it will be understood that any desired voltage regulator may be used in place of the arrangement described.

A cathode follower tube 96 is connected to the plate circuit of the photomultiplier tube 36 and is operated thereby, the resistance in the cathode circuit of the cathode follower tube 96 being arranged as a potentiometer 98 to vary the take-off of any of the taps, from zero to maximum, so that the amplifier 40 following may receive sufficient signal strength. The amplifier 40 is a conventional one and includes the clipping amplifier 101 for clipping signals below a certain level.

The amplified scintillation is delivered from the amplifier circuit 40 to the discharge tube 100, which may be either a gas filled discharge tube or a modulation tube, and the output from this tube is such that the exposure count lamp 34 and dial indicator lamp 102 flash for each scintillation of radioactivity received from the patient's body. In addition, the horn 104 is sounded each time the lamps 34 and 102 are flashed to give a sonic indication that the amplified scintillations are being recorded.

The power supply 38 for the amplifier 40, cathode follower 96, discharge tube 100, lamps 34 and 102, and horn 104 include the rectifier 87 and potentiometer 103 as well as other conventional elements, as illustrated.

It is deemed unnecessary to describe in detail the other elements of the circuit as these are all conventional and may be varied widely. The essential features of the circuit are the arrangement of the limit or micro switches in connection with the scanner motor and index motor, the use of a cathode follower in the plate circuit of the photomultiplier tube for delivering sufficient signal strength to the amplifier circuit 40 and, particularly, the provision of the gas filled discharge tube or modulation tube 100 for flashing the exposure count lamp 34 (as well as the dial indicator count lamp 102 and horn 104) so that each scintillation of radioactivity received from the patient's body is recorded on the film. In addition, the arrangement of the cathode circuit of the cathode follower 96 as a potentiometer is advantageous in providing sufficient signal strength for the amplifier 40 following.

In operation, the patient 16 is placed on the surface 22 of the cabinet 12, as illustrated in FIGURE 1, with the portion of the body to be scanned directly over the film 24, as best seen in FIGURE 2. Previously, a radioactive substance has been introduced into the patient. The main switch 80 and switch 74 to the scanner motor 48 (see FIGURE 8) are closed which supplies power to the scanner motor 48, the index motor 62, the power supply 38 for the amplifier circuit 40 and exposure count lamp 34 and the high voltage power supply 42 for the photomultiplier tube 36. Thus, the scanning head 26 reciprocates transversely across the film 24 and at each end of the stroke the index motor 62 is energized for a very short period of time to move the carriage 46 longitudinally a short distance and thereby (see FIGURE 4) the scanning head 26 before making a return stroke. In this manner, the entire surface of the film is exposed to the scanning head 26, all as previously described The scintillations from the radioactive substance previously introduced into the patient's body 16 enter the scanning head 26 and the scintillation crystal 35 which produces light to actuate the photomultiplier tube 36. The photomultiplier tube 36 multiplies each scintillation of radioactivity to a strength sufficient to operate the cathode follower 96 as shown in FIGURE 8. As previously mentioned, the resistance in the cathode circuit of the cathode follower 96 is arranged as a potentiometer 98 so that the amplifier 40 following receives sufficient signal strength. Each scintillation is therefore amplified in the amplifier circuit 40 and delivered to the gas filled discharge tube or modulation tube 100. The output from the tube 100 is such that the exposure count lamp 34 flashes for each scintillation of radioactivity received from the patient's body and is focused by the lens system 32 and makes a record on the film 24. As mentioned previously, the dial indicator count 102 and the horn 104 are flashed and sounded, respectively, at the same time.

Preferably before or after the recording of scintillations of radioactivity received from the patient's body 16, an X-ray is taken and recorded on the same film 24 by means of the X-ray tube 20 diagrammatically illustrated in FIGURES 1 and 2 and associated X-ray machine, not shown.

The resulting film is illustrated in FIGURE 3 which shows the dots 106 which represent the record representing the scintillations of radioactivity received from the patient's body 16. As mentioned previously, the particular circuit is advantageous in that all of the scintillations received from the patient's body are recorded on the film and in physical relationship with the X-ray of the patient's body 16 which is also reproduced or recorded on the photographic film 24.

If desired a portion of the collimation head or shield 28 may be removable or have a removable section so that a sample container may be inserted for assaying samples. In either case a scaler or count rate meter may be used in conjunction with the detection to determine the uptake of iodine.

Thus, the present invention is useful in recording size, contour and location of thyroid gland before surgery; in recording size contour and location of functioning thyroid tissue remaining after subtotal thyroidectomy; in recording size and location of functioning metastases of thyroid carcinoma; determining whether a thyroid nodule is functioning or not functioning; detecting a substernal thyroid; determining uniformity of radiogold injected into pleural or peritoneal cavities; in recording distribution of radiogold injected into prostate and the amount that finds its way to the liver and spleen; as well as other uses.

It is believed that the method of the invention is apparent from the foregoing description of a presently preferred apparatus of the invention. The method, however, comprises the steps of scanning the radiating area of the patient with a scintillation counter, converting the radiation pulses from the counter into a visual record, and providing an X-ray on the same visual record of the radiating area of the patient's body thereby relating the location, size and amount of radiation to the patient's body structure. The method also comprehends converting the radiation pulses from the scintillation counter into light impulses and recording the light impulses through the counter on the photographic film thereby positioning the recordation of the radioactivity substantially at the position of detection by the counter.

The present invention therefore is well suited and adapted to carry out the objects and ends and has the advantages mentioned as well as others inherent therein. While only a presently preferred embodiment of the invention is given for the purpose of disclosure, numerous rearrangement and substitution of parts and steps of the process may be made which are within the scope of the invention as defined by the appended claims.

What is claimed is:

1. A method of scintillation scanning of the body of a patient into which a radioactive substance has been introduced comprising scanning the radiating area of the patient with a scintillation counter, converting the radiation pulses from the scintillation counter into a visual record, and providing an X-ray of the radiating area of the patient's body on the same visual record while the body remains in position thereby relating the location, size and amount of radiation with the patient's body structure.

2. A method of scintillation scanning of the body of a patient into which a radioactive substance has been introduced comprising scanning the radiating area of the patient with a collimated detector, converting the detected radiation pulses from the detector into light impulses, and recording the light impulses through the detector onto a photographic film, and providing an X-ray of the radiating area of the patient's body on the same film while the body remains in the scanning position thereby relating the location, size and amount of radiation to the patient's body structure.

3. A method of radiologically scanning the human body comprising, introducing a radioactive substance into the human body, moving a collimated detector transversely and longitudinally adjacent the human body thereby detecting the radioactivity of each local area, converting the detected radiation into a visual photographic record, and X-raying the human body on the same photographic record while the body remains in position thereby relating the anatomy of the human body with the location of the detected radioactivity in the human body.

4. A method of scintillation scanning of the human body comprising introducing a radioactive substance in the human body, scanning the area of localized radioactivity with a collimated scintillation counter, converting the impulses from the scintillation counter into a visual record, and providing an X-ray of the portion of the body being scanned on the same visual record while the portion of the body being scanned remains in scanning position thereby depicting the radioactivity with reference to the body's structure.

5. A method of recording the amount and location of radioactivity which has been introduced into the body of a patient comprising placing the patient's body adjacent and above a photographic film, placing a collimated radiation detector below and adjacent the photographic film, scanning the radiating area with the detector, converting the radiation impulses from the detector into light impulses, recording the light impulses on the photographic film thereby measuring the contour, size and intensity of radioactivity in the radiating area, and recording an X-ray of the body on the same photographic film while the body remains in position thereby relating the radiation recordation directly with the anatomy of the body.

6. The method of claim 5 including recording the light impulses on the photographic film through the collimated detector thereby locating the photographic record of the radiation from the body substantially at the position of detection by the detector.

7. A scanning device for recording on film the scintillations of radioactivity received from the body of a patient comprising a support for holding said film, a collimated radiation detector disposed on a first side of said film and film support, said detector mounted for reciprocating transverse and longitudinal movement relative to the film, means attached to the detector for reciprocating the detector, means connected to a detector for recording the scintillations of radioactivity measured by the detector on the film, and an X-ray apparatus disposed on the second side of said film and arranged so that an X-ray of the patient is recorded on the film.

8. A scanning device for detecting and recording the size, contour and location of a radioactive substance in the body of a patient comprising supporting means supporting that portion of the body of the patient to be scanned, a film holder attached to said supporting means thereby holding the film adjacent the radiating area of the patient, a radioactive scanning detector disposed on one side of the film, means for moving the detector over the radiating area of the patient, means connected to the detector for recording the scintillations of radioactivity detected by the scanning detector on the film, and an X-ray apparatus disposed on the opposite side of the film relative to the scanning detector thereby recording the X-ray and radioactivity detected on the same film in relation to each other.

9. The invention of claim 8 wherein the means for moving the detector over the radiating area of the patient includes first and second worm screws arranged relative to the detector so that rotation of the first screw effects reciprocation of the detector in a transverse direction and rotation of the second screw effects reciprocation of the detector in a longitudinal direction, a scanning motor and an index motor for rotating the first and second screws, respectively, and limit switches at each end of travel of the detector for energizing momentarily the index motor for limited longitudinal movement at each end of travel of the detector, and engageable elements attached to the detector for engaging the limit switches.

10. An apparatus for scanning and detecting the amount and location of radioactive substance which has been introduced in the body of a patient comprising support means for supporting at least that portion of the body to be scanned, a film holder connected to the support means and positioned beneath the portion of the body of the patient to be scanned, a scanning head disposed beneath and adjacent the film, said scanning head including a radioactivity detector having a minute aperture collimated to detect over a small area at any one instant, means for moving the scanning head over the radiating area of the patient, means connected to the scanning head converting the scintillations detected into light pulses, means for recording said light pulses on the film, and an X-ray apparatus disposed above the film and the portion of the body to be scanned thereby recording the X-ray and the scintillations of radioactivity detected on the same film in relation to each other.

11. The invention of claim 10 wherein the means for recording the light pulses on the film are located in the scanning head.

12. An apparatus for scanning and detecting the amount and location of radioactive substance which has been introduced into the body of a patient comprising, a film holder positioned adjacent the portion of the body of the patient to be scanned, a scanning head disposed adjacent the side of the film holder remote from the portion of the body being scanned, said scanning head including a radioactivity detector having a minute aperture collimated to detect over a small area of any one instant, means for moving the scanning head over the radiating area of the patient, means connected to the scanning head converting the scintillations detected into light pulses, an exposure count lamp positioned in the scanning head adjacent the film holder for recording the light pulses on a film thereby recording the radioactivity substantially at the position of detection by the scanning head, and an X-ray apparatus disposed on the side of the portion of the body being scanned remote from the film holder thereby recording the X-ray and the scintillations of radioactivity detected on the same film and relative to each other.

References Cited in the file of this patent
UNITED STATES PATENTS

| 2,528,521 | Kaiser | Nov. 7, 1950 |
| 2,686,266 | Pringle et al. | Aug. 10, 1954 |
| 2,686,268 | Martin et al. | Aug. 10, 1954 |
| 2,776,377 | Anger | Jan. 1, 1957 |
| 2,837,657 | Craig et al. | June 3, 1958 |

OTHER REFERENCES

Kellershohn et al.: A Photographic Method for Determining the Localization and Distribution of a Radioactive Substance in the System, article in Peaceful Uses of Atomic Energy, Aug. 20, 1955, vol. 10, pages 387 to 391.

Cassen et al.: Possibilities and Limitations of In Vivo External Counting Techniques in Biology and Medicine, article in Peaceful Uses of Atomic Energy, Aug. 20, 1955, vol. 10, pages 244 to 248.